United States Patent [19]
Jacobs et al.

[11] 3,822,072
[45] July 2, 1974

[54] APPARATUS FOR AUTOMATICALLY COLLAPSING AND ERECTING SEAT BACK OF BABY STROLLER

[75] Inventors: Allen D. Jacobs; Robert V. Jacobs, both of Los Angeles, Calif.

[73] Assignee: Questor Corporation, Toledo, Ohio

[22] Filed: Dec. 19, 1972

[21] Appl. No.: 316,509

[52] U.S. Cl. ............................................. 280/36 B
[51] Int. Cl. ............................................. B62b 11/00
[58] Field of Search ........................ 280/36 B, 41 A

[56] References Cited
UNITED STATES PATENTS
2,728,580  12/1955  Preisler ............................ 280/36 B
3,184,249  5/1965  Shone ............................... 280/36 B
3,235,279  2/1966  Smith ............................... 280/36 B

*Primary Examiner*—Robert R. Song

[57] ABSTRACT

A collapsible stroller having a plate connected to the back seat frame which extends below said frame forward of an upwardly extending U-shaped bar secured between the two rear wheels of the stroller. When the stroller is erected, the plate contacts the U-shaped bar so as to move the back of the seat into a substantially vertical position.

4 Claims, 8 Drawing Figures

PATENTED JUL 2 1974

APPARATUS FOR AUTOMATICALLY COLLAPSING AND ERECTING SEAT BACK OF BABY STROLLER

The present invention relates to a new and improved collapsible baby stroller construction and more specifically to a construction which automatically collapses and erects the seat back of the stroller.

One of the most desireable aspects of a baby stroller is to provide a mechanism whereby the stroller itself may be collapsed and erected with the use of only one hand so that the person operating the mechanism may hold the infant in the other hand.

One particular example of a stroller of this type is shown in U.S. Pat. No. 3,184,249. This stroller discloses a collapsible baby stroller comprising a plurality of pivotally connected lightweight members that are locked in an erected position by a releasable catch mechanism capable of simple operation by the pressure of a person's toe. Once the device is released, the tubular members which constitute the framework are self folding into a compact unit which can easily be handled with one hand. Likewise, the stroller is unfolded by placement of the toe or foot of a person on the rear axle or wheel and, with a one hand lifting movement, the stroller is erected and the catch is secured through self-action so as to place the frame of the stroller in an upright position.

In the stroller as shown in the above mentioned patent and generally described above, the seat back of the chair itself does not erect itself along with the rest of the stroller mechanism. Therefore, the operator must also be able to reach down and adjust the seat back before the infant can be placed in the stroller.

Accordingly, it is object of the present invention to provide an improved collapsible stroller wherein the erecting mechanism includes apparatus for erecting the seat back of the stroller and maintaining it in a fixed position.

Other objects of the invention will become obvious from the following description taken in conjunction with the drawings wherein.

Figure 1:
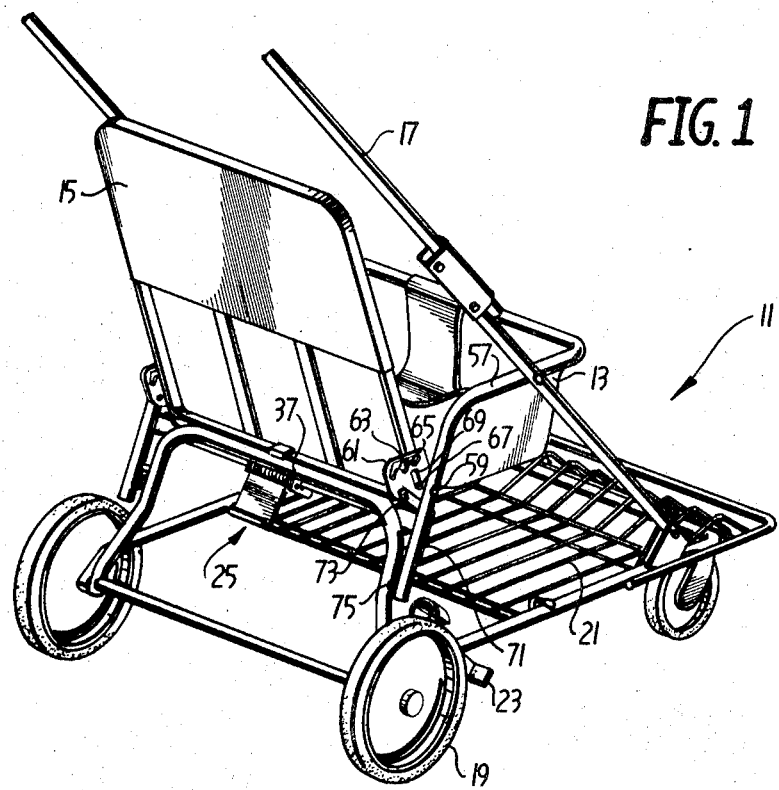
FIG. 1 is a perspective view of the stroller of the present invention in an erected position.

The present invention relates to apparatus which cooperates with the collapsible framework of a stroller. The apparatus comprises a plate which is connected to the back seat frame and extends below the back seat frame forward of an upwardly extending U-shaped bar secured between the two rear wheels. When the stroller is erected, the plate contacts the U-shaped bar so as to move the back of the seat into a substantially vertical position. The back of the seat is then maintained in an upright position by the U-shaped bar. When the stroller is collapsed, the U-shaped bar moves away from the plate and allows the seat back to fold into a collapsed position along with the remaining parts of the stroller frame.

Turning now more specifically to the drawings, there is shown a stroller 11 having a basic seat structure 13 and a seat back 15. The stroller also includes handle assembly 17, wheels 19, a foot rest rack 21, and a standard braking mechanism 23.

Figure 4:
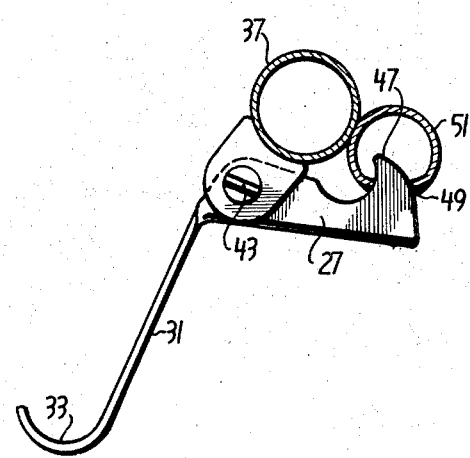
FIG. 4 is a partial sectional view showing the position of the latch when the stroller is in the erected position.
Figure 2:
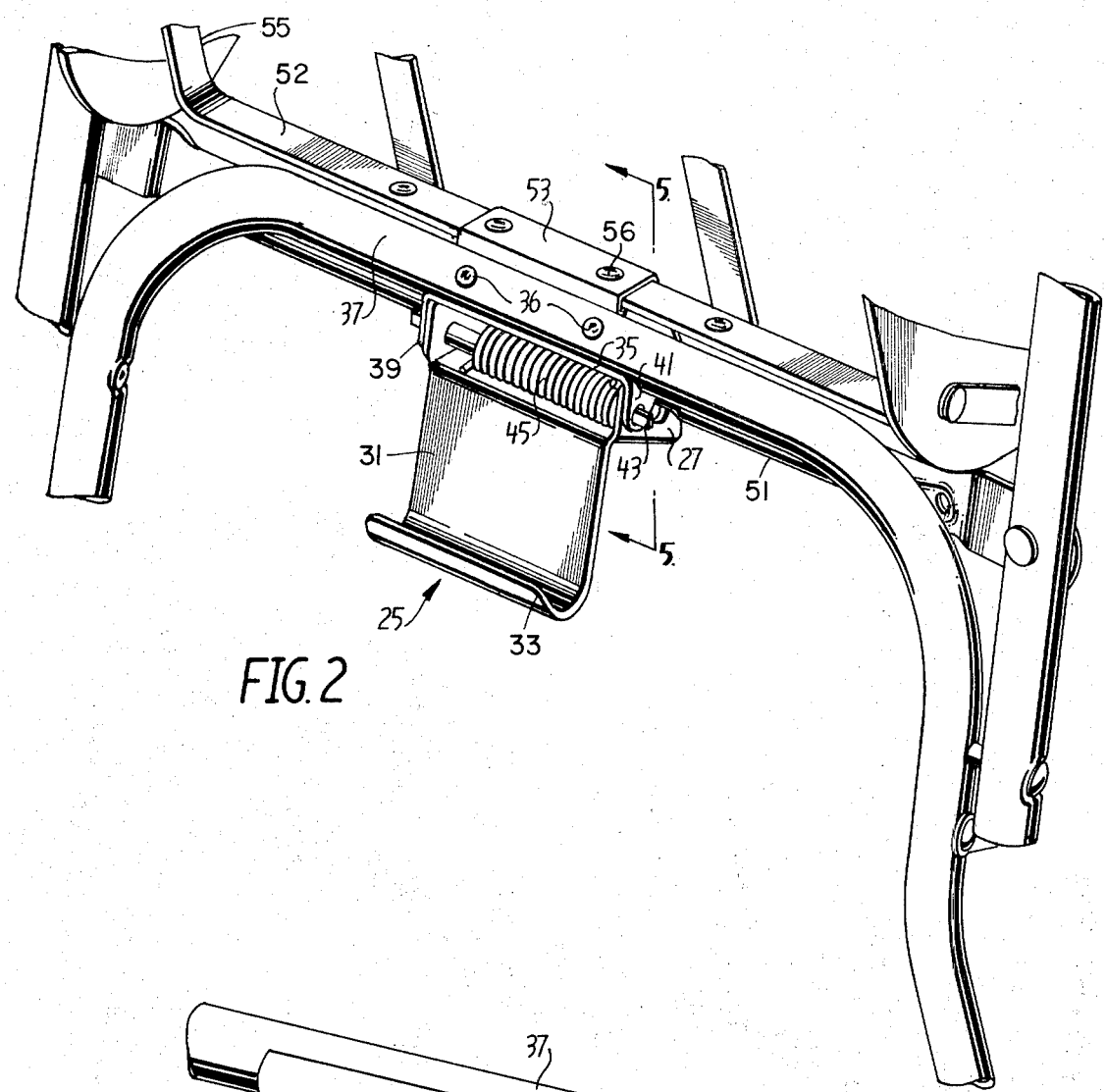
FIG. 2 is a partial view of the latching mechanism of the stroller of FIG. 1.
Figure 3:
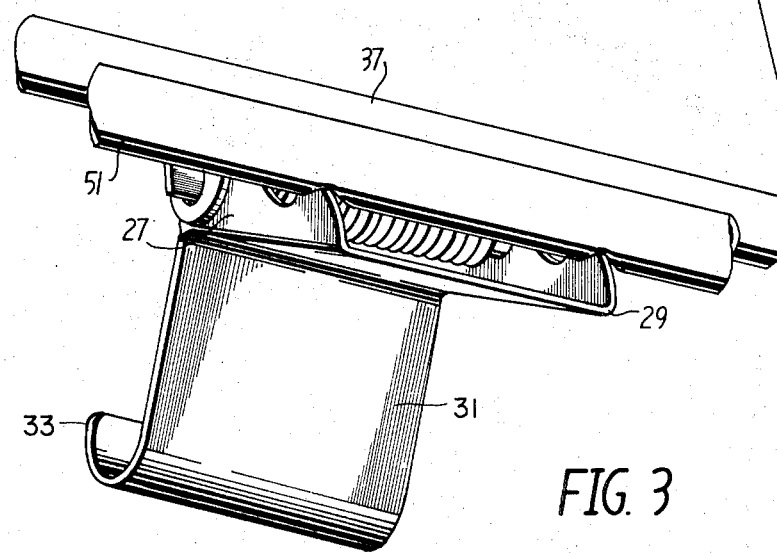
FIG. 3 is a front perspective view of the latching mechanism of the stroller of FIG. 1.

In order that the stroller may be erected and collapsed, there is included a release mechanism generally indicated at 25. This mechanism is shown in more detail in FIGS. 2, 3, and 4. It will be seen that release mechanism 25 includes two parallel plates 27 and 29 which are spaced from each other and which are also integral with a subtending plate 31 which terminates in a lip 33.

A metal plate 35 is secured to a tubular U-shaped member 37 substantially at the center of the bite thereof by means such as rivets 36. At either end of the plate 35, downwardly extending tabs 39 and 41 support a shaft 43 on which is mounted a spring 45. The spring is so placed as to bias the plate members 27 and 29, which are also mounted on a shaft 43, in a counter clockwise direction.

A tubular cross bar member 51 is secured at either end to the frame of the seat 13. Each of the parallel plates 27 and 29 terminate in upwardly extending fingers 47. These fingers mate with an aperture 49 in tubular member 51 when the stroller is in its erected position. As may be seen from FIG. 4, the shape of the fingers locks the mechanism securely in the upright position.

Turning now more specifically to FIGS. 5–8 it is seen that a plate having an upper section 53 rests upon the back of the lower section 52 of the frame 55 of the back 15 of the seat. The plate may be secured to lower section 52 by means such as rivets 56. The plate includes an integral subtending face plate 54 which extends well below section 52.

Figure 6:
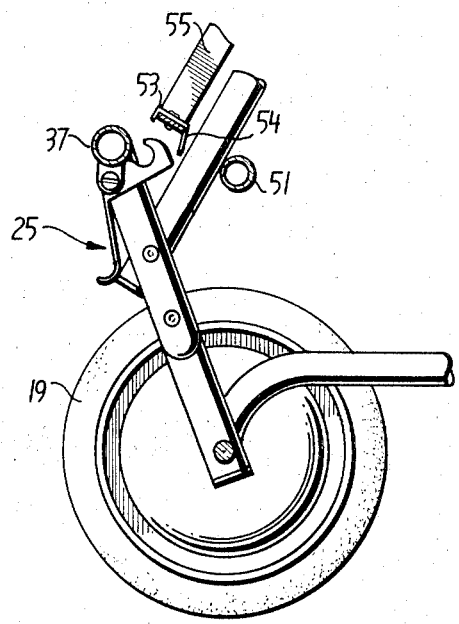
Figure 5:
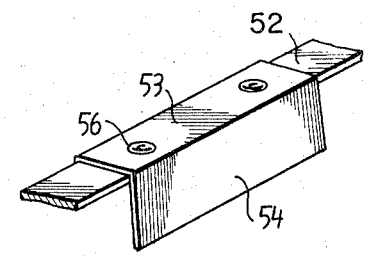
FIG. 5 is a perspective view of the apparatus which cooperates with the frame of the stroller to erect the back of the seat; and, FIGS. 6, 7, and 8 are progressive positions illustrating the operation of the mechanism of the present invention.

FIG. 6 shows the mechanism as it is being raised when the operator places one foot on the lower frame or wheel and lifts upwardly on the arms 17. As the arms are raised, the U-shaped member 37 is forced upwardly and forwardly. This occurs due to the use of a further U-shaped linkage arm 71 which is attached between a plate 61 and the U-shaped member 37 by means such as rivets 73 and 75. Plate 61 is pivotally secured to the seat frame by rivet 59. Plate 61 is shown only generally. However, plate 61 is provided with pins 65 and 67 and notches 63 and a slot 69. Notches 63 mate with pin 65 and slot 69 mates with pin 67. The purpose of this construction is to allow the back seat to be placed in several different angular configurations relative to the seat itself. The basic concept of such a seat control is described in U.S. Pat. No. 3,184,249 discussed above. The mechanism involving U-shaped linkage arm 71 is pivotal about rivets 73 and 75 as described in detail in the above-identified patent. This provides the necessary cooperative action between the seat frame and U-shaped member 37.

Figure 7:
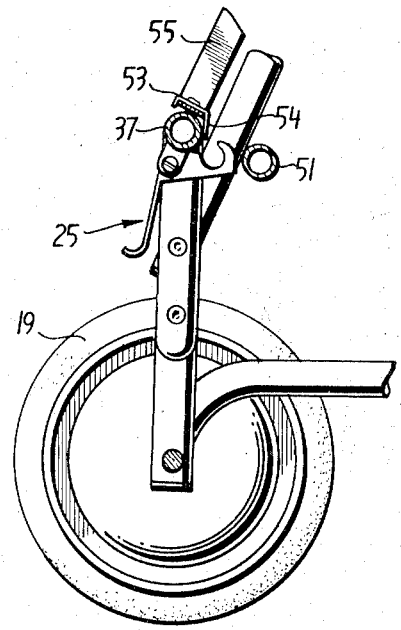

FIG. 7 shows the stroller when it has been raised to a position short of erection on its travel to the final position. It will be seen that at this point downwardly subtending face 54 strikes the bit of the U-shaped member 37.

Figure 8:
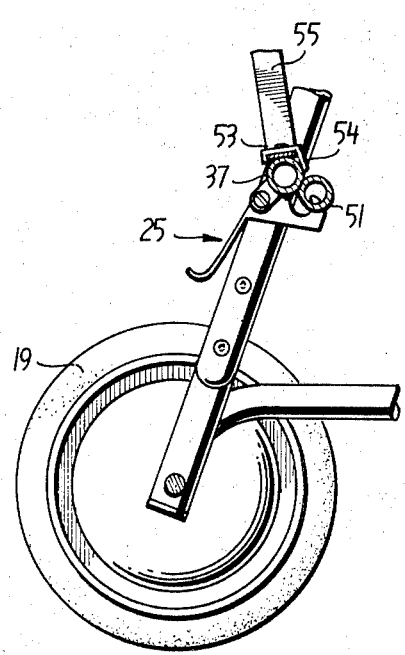

As U-shaped member 37 continues in its motion, it automatically forces itself against plate 54 and raises the seat back into the desired substantially vertical position. Further, the locked position of the U-shaped member as shown in FIG. 8 restrains the back seat frame 55 against forward movement.

It will be obvious that the reverse operation, that is the folding of the seat, allows the U-shaped member to release the back of the seat so as to cause it to drop into the folded position.

Thus, the present invention has provided an improved collapsible stroller wherein not only the frame of the stroller automatically erects and collapses with a single movement of the hand, but also the back seat frame is likewise automatically erected and collapsed at the same time.

It is to be understood that the above description and drawings are descriptive only in that the scope of the invention is to be limited only by the following claims.

We claim:

1. In a stroller including front and rear wheels, apparatus for automatically collapsing and erecting said stroller comprising a U-shaped base frame having spaced parallel side members;

a U-shaped handle assembly comprising a pair of spaced parallel side members having the free ends thereof pivotally connected to opposed intermediate points along the parallel side members of said base frame;

a U-shaped seat support frame comprising spaced parallel side members having the portions thereof adjacent the bight of said support frame disposed in parallel relation to the parallel side members of said base frame, and a second portion of the side members of the support frame extending downwardly toward the free ends of the parallel side members of said base frame, said support frame further including a connecting member disposed in parallel relation to said bight connecting the second portions of the side members of said support frame;

a rear inverted U-shaped member comprising parallel leg members having the free ends thereof pivotally attached to the base frame adjacent the free ends of the parallel side members of said base frame;

a seat back frame including parallel side members and a connecting lower member deposed in parallel relation to the bight of said rear inverted U-shaped member;

means for pivotally connecting said parallel sides of said seat back frame to said second portion of the side members of the support frame;

disengageable clamping means connecting the bight portion of said rear inverted U-shaped member to said connecting member said disengageable clamping means comprising a metal plate pivotally secured to the bight of said rear inverted U-shaped member and having one end extending downwardly therefrom, apertures in said connecting member, fingers at the other end of said plate for releasably mating with said apertures, spring means for biasing said plate in a direction so as to maintain said fingers within said apertures; and a plate connected to said connecting lower member of said seat back frame and extending below said connecting lower member forward of said rear inverted U-shaped member;

said rear inverted U-shaped member contacting said plate when said stroller is moved to an operable position, said plate maintaining said seat back in a substantially upright position.

2. The stroller of claim 1 wherein said plate member is secured substantially centrally of said connecting lower member.

3. A collapsible baby stroller including supporting wheels comprising a U-shaped base frame, a U-shaped handle assembly pivotally connected to opposed intermediate points of said base frame, a U-shaped seat support frame pivotally secured to opposed intermediate points of said handle assembly, an inverted U-shaped seat back frame pivotally secured at the lower end thereof to said seat support frame, an inverted U-shaped member having the free ends thereof pivotally secured to the rear of said base frame, a lower member connecting the free ends of said U-shaped seat back frame and deposed in parallel relation to the bight of said inverted U-shaped member;

a latching mechanism means for securing said inverted U-shaped member and said seat support frame in an erected locked position, and means secured to said lower member of said seat back frame and extending downwardly therefrom for contacting the bight portion of said inverted U-shaped member as said stroller is erected so as to move said seat back frame into a substantially upright position.

4. The stroller of claim 3 wherein said means secured to said seat back frame comprises a solid plate subtending from the lower section of said seat back member.

* * * * *